(12) United States Patent
Wang et al.

(10) Patent No.: US 9,919,702 B1
(45) Date of Patent: Mar. 20, 2018

(54) SYSTEMS AND METHODS FOR MANAGING BATTERY STATE OF CHARGE

(71) Applicant: GM Global Technology Operations LLC, Detroit, MI (US)

(72) Inventors: Konking Wang, Canton, MI (US); Aniket P. Kothari, Rochester Hills, MI (US); Brendan M. Conlon, Rochester Hills, MI (US); Daniel R. Brouns, Clarkston, MI (US); Cotrina C. Connolly, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/418,365

(22) Filed: Jan. 27, 2017

(51) Int. Cl.
| | | |
|---|---|---|
| *B60W 20/40* | (2016.01) | |
| *B60L 11/14* | (2006.01) | |
| *H02J 7/00* | (2006.01) | |
| *B60W 20/13* | (2016.01) | |
| *B60L 11/18* | (2006.01) | |
| *B60W 20/50* | (2016.01) | |

(52) U.S. Cl.
CPC .............. *B60W 20/40* (2013.01); *B60L 11/14* (2013.01); *B60L 11/1861* (2013.01); *B60W 20/13* (2016.01); *B60W 20/50* (2013.01); *H02J 7/007* (2013.01); *B60L 2240/12* (2013.01); *B60L 2240/44* (2013.01); *B60L 2240/545* (2013.01); *B60L 2240/547* (2013.01); *B60W 2510/244* (2013.01); *B60W 2510/246* (2013.01); *B60W 2520/10* (2013.01); *B60W 2710/021* (2013.01); *B60W 2710/244* (2013.01); *B60Y 2300/42* (2013.01); *B60Y 2300/91* (2013.01); *B60Y 2400/112* (2013.01); *Y10S 903/93* (2013.01)

(58) Field of Classification Search
CPC ...... B60W 20/40; B60W 20/13; B60W 20/50; B60L 11/14; B60L 11/1861
USPC .......................................................... 701/22
See application file for complete search history.

(56) References Cited

U.S. PATENT DOCUMENTS

| | | | | |
|---|---|---|---|---|
| 6,841,972 B2* | 1/2005 | Koo | ......................... | B60K 6/46 320/132 |
| 8,450,974 B2* | 5/2013 | Stewart | ............... | H01M 16/006 180/65.29 |
| 8,676,415 B2* | 3/2014 | Okubo | .................. | B60W 20/13 180/65.265 |
| 2015/0214761 A1* | 7/2015 | Kono | ........................ | B60L 9/18 320/107 |

* cited by examiner

*Primary Examiner* — Tan Q Nguyen

(57) ABSTRACT

An inverter power module: selectively applies power from a battery to a permanent magnet (PM) electric motor; and selectively provides power output by the PM electric motor for the battery. A switch, when open, prevents power flow the inverter power module from the battery, and, when closed, enables power flow between the inverter power module and the battery. An adjustment module determines an SOC adjustment based on at least one of a vehicle speed and a temperature of the battery. A maximum module receives a first maximum SOC of the battery and that determines a second maximum SOC of the battery based on the first maximum SOC and the SOC adjustment. A clutch control module disengages a clutch, decoupling the PM electric motor from a transmission, when the switch is stuck closed and an SOC of the battery is greater than the second maximum SOC.

20 Claims, 7 Drawing Sheets

SYSTEMS AND METHODS FOR MANAGING BATTERY STATE OF CHARGE

FIELD

The present disclosure relates to vehicle systems and more particularly to systems and methods for managing a state of charge (SOC) of a battery when a switch is stuck or welded in a closed state.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some types of vehicles include only an internal combustion engine that generates propulsion torque. Hybrid vehicles include both an electric motor and an internal combustion engine. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, which drives a transmission. This allows the electric motor to assume some of the power responsibilities of the engine, which may permit the use of a smaller and possibly more efficient engine.

SUMMARY

In a feature, a state of charge (SOC) control system of a vehicle is described, An inverter power module: when being switched, selectively applies power from a battery to a permanent magnet (PM) electric motor; and, when not being switched, selectively provides power output by the PM electric motor for the battery. A switch (i) is connected between the inverter power module and the battery, (ii), when open, prevents power flow the inverter power module from the battery, and (iii), when closed, enables power flow between the inverter power module and the battery. An adjustment module determines an SOC adjustment based on at least one of (i) a vehicle speed and (ii) a temperature of the battery. A maximum module receives a first maximum SOC of the battery that is less than 100 percent and that determines a second maximum SOC of the battery based on the first maximum SOC and the SOC adjustment. A clutch control module disengages a clutch, thereby decoupling the PM electric motor from a transmission, when the switch is stuck closed and an SOC of the battery is greater than the second maximum SOC.

In further features, a SOC module determines the SOC of the battery based on at least one of a voltage of the battery and current through the switch.

In further features: the adjustment module sets the SOC adjustment to a predetermined value when the vehicle speed is less than a predetermined speed; and the maximum module sets the second maximum SOC equal to the first maximum SOC when the SOC adjustment is set to the predetermined value.

In further features, when the vehicle speed is greater than the predetermined speed, the maximum module sets the second maximum SOC to less than the first maximum SOC based on the SOC adjustment.

In further features, the adjustment module determines the SOC adjustment based on both (i) the vehicle speed and (ii) the temperature of the battery.

In further features, the adjustment module determines the SOC adjustment using a lookup table that relates vehicle speeds and battery temperatures to SOC adjustments.

In further features: the adjustment module sets the SOC adjustment to a first value when the vehicle speed is a first speed and the temperature of the battery is a first temperature; the adjustment module sets the SOC adjustment to a second value when the vehicle speed is the first speed and the temperature of the battery is a second temperature; the second temperature is less than the first temperature; the maximum module sets the second maximum SOC to a third value based on the first maximum SOC when the SOC adjustment is set to the first value; the maximum module sets the second maximum SOC to a fourth value based on the first maximum SOC when the SOC adjustment is set to the second value; and the fourth value is less than the third value.

In further features, the clutch control module also disengages the clutch when the vehicle speed is greater than a predetermined speed.

In further features, the predetermined speed is greater than 80 miles per hour.

In further features, zero other switches are connected between inverter power module and the battery to, independently of whether the switch is open or closed, enable power flow between the inverter power module and the battery.

In a feature, a state of charge (SOC) control method for a vehicle includes: by an inverter power module, when being switched, selectively applying power from a battery to a permanent magnet (PM) electric motor; by the inverter power module, when not being switched, selectively providing power output by the PM electric motor for the battery; selectively opening and closing a switch is connected between the inverter power module and the battery, wherein, when open, the switch prevents power flow the inverter power module from the battery, and wherein, when closed, the switch enables power flow between the inverter power module and the battery; determining an SOC adjustment based on at least one of (i) a vehicle speed and (ii) a temperature of the battery; receiving a first maximum SOC of the battery that is less than 100 percent; determining a second maximum SOC of the battery based on the first maximum SOC and the SOC adjustment; and disengaging a clutch, thereby decoupling the PM electric motor from a transmission, when the switch is stuck closed and an SOC of the battery is greater than the second maximum SOC.

In further features, the SOC control method further includes determining the SOC of the battery based on at least one of a voltage of the battery and current through the switch.

In further features, the SOC control method further includes: setting the SOC adjustment to a predetermined value when the vehicle speed is less than a predetermined speed; and setting the second maximum SOC equal to the first maximum SOC when the SOC adjustment is set to the predetermined value.

In further features, the SOC control method further includes, when the vehicle speed is greater than the predetermined speed, setting the second maximum SOC to less than the first maximum SOC based on the SOC adjustment.

In further features, the SOC control method further includes determining the SOC adjustment based on both (i) the vehicle speed and (ii) the temperature of the battery.

In further features, the SOC control method further includes determining the SOC adjustment using a lookup table that relates vehicle speeds and battery temperatures to SOC adjustments.

In further features, the SOC control method further includes: setting the SOC adjustment to a first value when the vehicle speed is a first speed and the temperature of the battery is a first temperature; setting the SOC adjustment to a second value when the vehicle speed is the first speed and the temperature of the battery is a second temperature, wherein the second temperature is less than the first temperature; setting the second maximum SOC to a third value based on the first maximum SOC when the SOC adjustment is set to the first value; and setting the second maximum SOC to a fourth value based on the first maximum SOC when the SOC adjustment is set to the second value, wherein the fourth value is less than the third value.

In further features, the SOC control method further includes disengaging the clutch when the vehicle speed is greater than a predetermined speed.

In further features, the predetermined speed is greater than 80 miles per hour.

In further features, zero other switches are connected between inverter power module and the battery to, independently of whether the switch is open or closed, enable power flow between the inverter power module and the battery.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An internal combustion engine of a vehicle combusts air and fuel within cylinders to generate propulsion torque. The engine outputs torque to wheels of the vehicle via a transmission. An electric motor is mechanically coupled to a shaft of the transmission via a clutch. When the clutch is engaged, the electric motor rotates with the transmission shaft.

Under some circumstances, a hybrid control module of the vehicle may apply power to the electric motor from a battery to cause the electric motor to output torque to the transmission. Under other circumstances, the hybrid control module may disable power flow to the electric motor and allow the transmission to drive rotation of the electric motor.

The electric motor generates power when driven by the transmission. Power generated by the electric motor can be used to recharge the battery when a voltage generated via the electric motor is greater than a voltage of the battery.

A switch is connected between the electric motor and the battery. The switch can be opened to prevent current flow between the electric motor and the battery and can be closed to allow current flow between the electric motor and the battery. If the switch is welded closed, however, the electric motor could overcharge the battery under some circumstances.

According to the present disclosure, when the switch is stuck closed, the hybrid control module disengages the clutch when a state of charge (SOC) of the battery is greater than a maximum SOC of the battery. The hybrid control module determines the maximum SOC of the battery based on a vehicle speed and a temperature of the battery such that the maximum SOC may be less than a predetermined maximum SOC of the battery.

Since the electric motor spins after disengagement of the clutch and disengagement of the clutch takes a period of time, disengaging the clutch when the SOC is greater than the maximum SOC may help prevent overcharging of the battery and prevent the SOC from exceeding the predetermined maximum SOC. Disengaging the clutch also eliminates the need to implement a second switch that is redundant to the switch that could be opened when the switch is stuck closed. Not including the second switch lowers vehicle cost, engineering cost, and also eliminates any diagnostic requirements associated with implementing the second switch.

Figure 1:
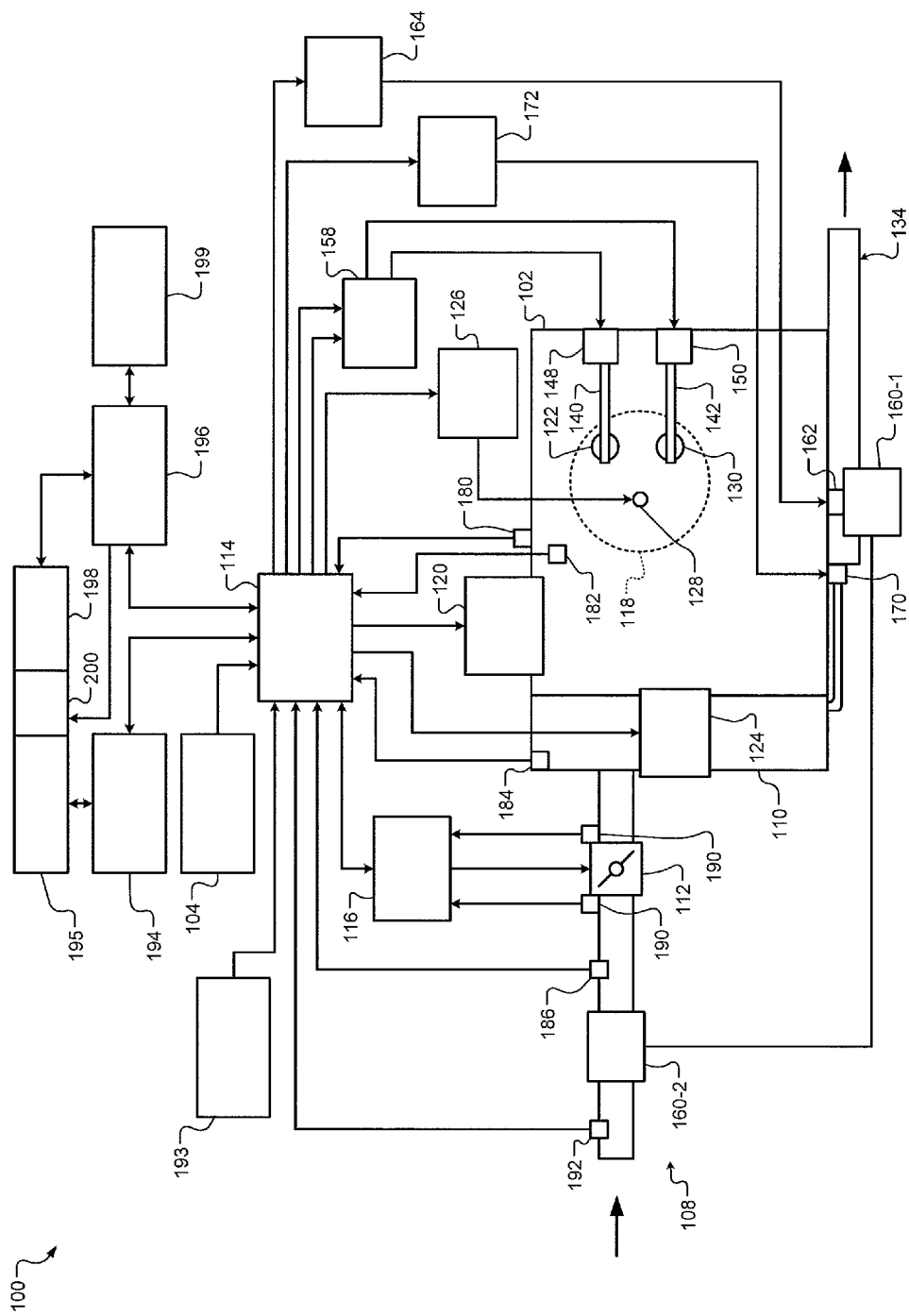
FIG. 1 is a functional block diagram of an example engine control system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184.

In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery 199 to the electric motor 198 to cause the electric motor 198 to output positive torque. While the example of the battery 199 is provided, more than one battery may be used to supply power to the electric motor 198. The battery 199 may be dedicated for power flow to and from the electric motor 198, and one or more other batteries may supply power for other vehicle functions.

The electric motor 198 may output torque, for example, to an input shaft of the transmission 195 or to an output shaft of the transmission 195. A clutch 200 is engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The hybrid control module 196 may also selectively convert mechanical energy of the vehicle into electrical energy. More specifically, the electric motor 198 generates and outputs power via back EMF when the electric motor 198 is being driven by the transmission 195 and the hybrid control module 196 is not applying power to the electric motor 198 from the battery 199. The hybrid control module 196 may charge the battery 199 via the power output by the electric motor 198. This may be referred to as regeneration.

Figure 2:
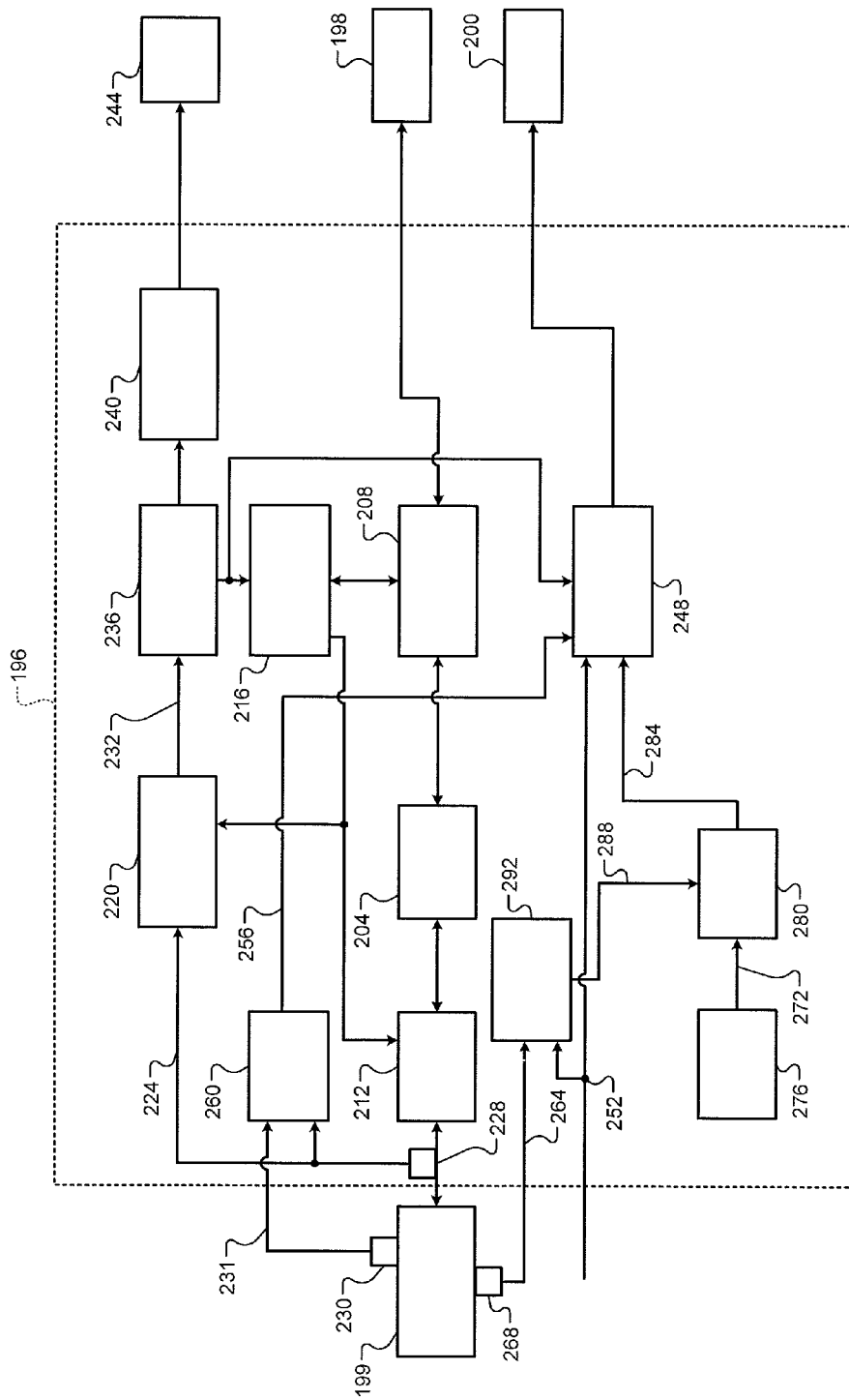
FIG. 2 is a functional block diagram including an example implementation of a hybrid control module.

FIG. 2 is a functional block diagram including an example implementation of the hybrid control module 196. One or more filters, such as filter 204, are electrically connected between an inverter power module 208 and the battery 199. The filter 204 may include one or more filter components, such as one or more capacitors and/or resistors.

One or more switches, such as switch 212, are also electrically connected between the inverter power module 208 and the battery 199. For example, the switch 212 may be connected between the filter 204 and the battery 199. When open, the switch 212 prevents power flow to the battery 199 from the inverter power module 208 and vice versa. When closed, the switch 212 allows power flow to the battery 199 from the inverter power module 208 and vice versa.

The inverter power module 208 includes a plurality of switches. The inverter power module 208 switches to convert DC power from the battery 199 into alternating current (AC) power and apply the AC power to the electric motor 198 to drive the electric motor 198. For example, the inverter power module 208 may convert the DC power from the battery 199 into 3-phase AC power and apply the 3-phase AC power to windings of the electric motor 198. A switching control module 216 controls switching of the switching devices of the inverter power module 208, as discussed further below.

The inverter power module 208 also converts AC power output by the electric motor 198 (e.g., by the transmission 195 driving the electric motor 198 while the clutch 200 is engaged) into DC power and outputs the DC power, for example, to charge the battery 199. The inverter power module 208 may output power from the electric motor 198, for example, when a voltage output of the electric motor 198 is greater than a voltage of the battery 199 (and the filter 204).

Figure 3:
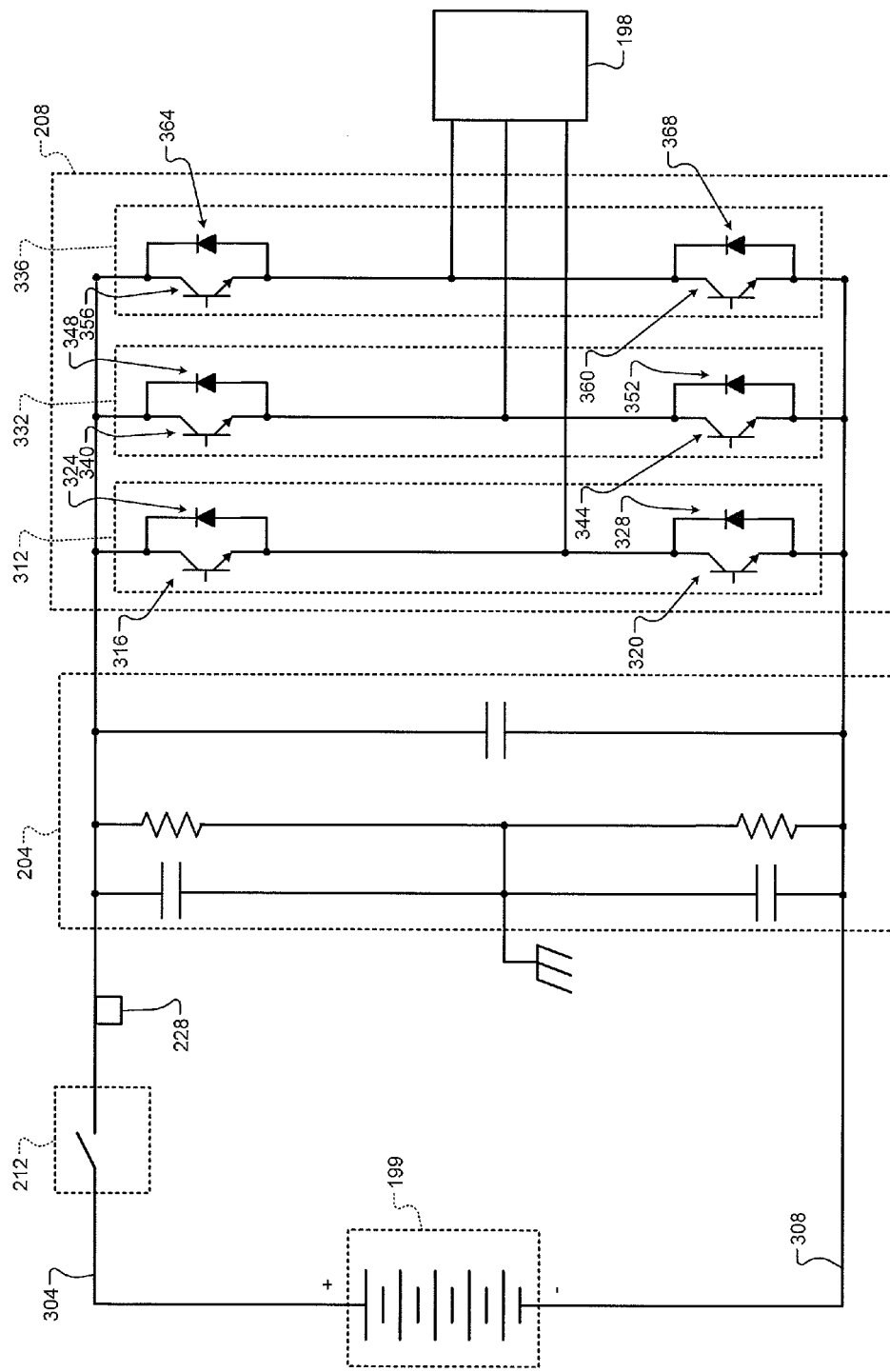
FIG. 3 is a schematic including example implementations of a filter, an inverter power module, and a switch connected between a battery and an electric motor.

FIG. 3 includes a schematic including example implementations of the filter 204, the inverter power module 208, and the switch 212. The filter 204 may include one or more capacitors, such as shown in FIG. 3, connected between high (positive) and low (negative) sides 304 and 308. In the example of FIG. 3, the filter 204 also includes a plurality of resistors. Positive and negative terminals of the battery 199 are also connected to the high and low sides 304 and 308, respectively.

The inverter power module 208 is also connected between the high and low sides 304 and 308. In the example of the electric motor 198 being a three-phase permanent magnet (PM) electric motor, the inverter power module 208 may include three legs, one leg connected to each phase of the electric motor 198.

A first leg 312 includes first and second switches 316 and 320. The switches 316 and 320 each include a first terminal, a second terminal, and a control terminal. Each of the switches 316 and 320 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

The first terminal of the first switch 316 is connected to the high side 304. The second terminal of the first switch 316 is connected to the first terminal of the second switch 320. The second terminal of the second switch 320 may be connected to the low side 308. A node connected to the second terminal of the first switch 316 and the first terminal of the second switch 320 may be connected to a first phase of the electric motor 198.

The switching control module 216 (FIG. 2) may control switching of the switches 316 and 320 using pulse width modulation (PWM) signals. For example, the switching control module 216 may apply PWM signals to the control terminals of the switches 316 and 320. When on, power flows from the battery 199 to the electric motor 198 to drive the electric motor 198.

The switching control module 216 may apply complementary PWM signals to the control terminals of the switches 316 and 320. In other words, the PWM signal applied to the control terminal of the first switch 316 is opposite in polarity to the PWM signal applied to the control terminal of the second switch 320. Short circuit current may flow when the turning on of one of the switches 316 and 320 overlaps with the turning off of the other of the switches 316 and 320. As such, the switching control module 216 may generate the PWM signals to turn both of the switches 316 and 320 off during a deadtime before turning either one of the switches 316 and 320 on. With this in mind, generally complementary may mean that two signals have opposite polarities for most of their periods when power is being output to the electric motor 198. Around transitions, however, both PWM signals may be have the same polarity for some overlap period.

The first leg 312 also includes first and second diodes 324 and 328 connected anti-parallel to the switches 316 and 320, respectively. In other words, an anode of the first diode 324 is connected to the second terminal of the first switch 316, and a cathode of the first diode 324 is connected to the first terminal of the first switch 316. An anode of the second diode 328 is connected to the second terminal of the second switch 320, and a cathode of the second diode 328 is connected to the first terminal of the second switch 320. When the switches 316 and 320 are off (and open), power generated by the electric motor 198 is transferred through the diodes 324 and 328 when the output voltage of the electric motor 198 is greater than the voltage of the battery 199. This charges the battery 199.

The inverter power module 208 also includes second and third legs 332 and 336. The second and third legs 332 and 336 may be (circuitry wise) similar or identical to the first leg 312. In other words, the second and third legs 332 and 336 may each include respective components for the switches 316 and 320 and the diodes 324 and 328, connected in the same manner as the first leg 312. For example, the second leg 332 includes switches 340 and 344 and anti-parallel diodes 348 and 352. A node connected to the second terminal of the switch 340 and the first terminal of the switch 344 may be connected to a second phase of the electric motor 198. The third leg 336 includes switches 356 and 360 and anti-parallel diodes 364 and 368. A node connected to the second terminal of the switch 356 and the first terminal of the switch 360 may be connected to a third phase of the electric motor 198.

The PWM signals provided to the switches of the second and third legs 332 and 336 may also be generally complementary. The PWM signals provided to the second and third legs 332 and 336 may be phase shifted from each other and from the PWM signals provided to the switches 316 and 320 of the first leg 312. For example, the PWM signals for each leg may be phase shifted from each other by 120°.

The switch 212 may be a high side switch connected to open and close the high side 304. In other words, the switch 212 may be opened to create an open circuit in the high side 304 and disconnect the battery 199 from the filter 204, the inverter power module 208, and the electric motor 198. The switch 212 may be closed to connect the battery 199 with the filter 204, the inverter power module 208, and the electric motor 198. The switch 212 may be, for example, IGBT or another suitable type of switch.

The switching control module 216 may also control switching of the switch 212. The switching control module 216 may, for example, apply a signal to a control terminal of the switch 212 to open the switch 212 to prevent power flow to or from the battery 199, such as when the electric motor 198 is not to generate positive torque and under other circumstances. The switching control module 216 may apply a signal to the control terminal of the switch 212 to close the switch 212 to allow power flow to and from the battery 199, such as to apply power to the electric motor 198 and/or to recharge the battery 199.

Under some circumstances, however, the switch 212 may remain closed despite the switching control module 216 applying the signal to the control terminal of the switch 212 to open the switch 212. The switch 212 may, for example, be welded closed or otherwise be stuck closed under some circumstances.

Referring back to FIG. 2, a fault diagnostic module 220 diagnoses whether the switch 212 is stuck closed. For example, the fault diagnostic module 220 may diagnose that the switch 212 is stuck closed when current 224 to or from the battery 199 is greater than a predetermined current (e.g., zero or greater than zero) when the switching control module 216 is applying the signal to the control terminal of the switch 212 to open the switch 212. The switching control module 216 may also close one or more of the switches of one or more of the legs of the inverter power module 208 for this diagnosis. When the switch 212 is open, the current 224 should be zero, so the current 224 being greater than the predetermined current may indicate that the switch 212 is stuck closed. The fault diagnostic module 220 may diagnose that the switch 212 is not stuck closed when the current 224 is less than or equal to the predetermined current. Again, the switching control module 216 may also close one or more of the switches of one or more of the legs of the inverter power module 208 for this diagnosis.

A current sensor 228 measures the current 224 to and from the battery 199. An example location of the current sensor 228 is shown in the example of FIG. 3, however, the current sensor 228 may be located in another place. A voltage sensor 230 measures a voltage 231 of the battery 199, such as a voltage across the positive and negative terminals of the battery 199.

The fault diagnostic module 220 stores a fault indicator 232 in memory 236 based on the diagnosis. The fault indicator 232 indicates whether the switch 212 is stuck closed or not. For example, the fault diagnostic module 220 may set the fault indicator 232 to a first state when the switch 212 is stuck closed and set the fault indicator to a second state when the switch 212 is not stuck closed.

A monitoring module 240 may monitor the memory 236 and illuminate a malfunction indicator light (MIL) 244 when the fault indicator 232 is in the first state. In other words, the monitoring module 240 may illuminate the MIL 244 when the switch 212 is stuck closed. One or more other remedial actions may also be taken when the switch 212 is stuck closed.

A clutch control module 248 controls actuation of the clutch 200. More specifically, the clutch control module 248 selectively actuates the clutch 200 to engage the clutch 200 and selectively actuates the clutch 200 to disengage the clutch 200. Generally, the clutch control module 248 maintains the clutch 200 engaged until a vehicle speed 252 is greater than a first predetermined speed. In other words, the clutch control module 248 maintains the clutch 200 engaged when the vehicle speed 252 is less than the first predetermined speed. The clutch control module 248 disengages the clutch 200 when the vehicle speed 252 is greater than the first predetermined speed.

The first predetermined speed is greater than zero, may be greater than 80 miles per hour, may be greater than 100 miles per hour, or may be greater than 120 miles per hour based on the vehicle. The first predetermined speed may be calibratable and may be set based on a speed of the electric motor 198 where, when the clutch 200 is engaged, the electric motor 198 will generate and output a voltage that is greater than a predetermined maximum voltage of the battery 199. The battery 199 may be damaged at voltages greater than the predetermined maximum voltage. For example only, the first predetermined speed may be approximately 150 miles per hour in various implementations.

The vehicle speed 252 may be, for example, determined based on one or more wheel speeds. For example, the vehicle speed 252 may be set based on an average of two or more wheel speeds (e.g., undriven wheel speeds) measured using wheel speed sensors.

When the switch 212 is stuck closed and the clutch 200 is engaged, the power output by the electric motor 198 may overcharge the battery 199, even at vehicle speeds that are less than the first predetermined speed. The clutch control module 248 therefore also selectively disengages the clutch 200 based on a state of charge (SOC) 256 of the battery 199 when the switching control module 216 is not switching the switches to apply power to the electric motor 198, the switch 212 is stuck closed, and the electric motor 198 is spinning due to the engagement of the clutch 200.

A SOC module 260 determines the SOC 256 of the battery 199. The SOC module 260 may determine the SOC 256 of the battery 199 based on the voltage 231 of the battery 199. For example, the SOC module 260 may determine the SOC 256 using one of a lookup table and an equation that relates voltages of the battery 199 to SOCs of the battery 199.

The SOC module 260 may determine the SOC 256 additionally or alternatively based on the current 224 to and from the battery 199. For example, the SOC module 260 may determine a mathematical integral of the current 224 over each predetermined period and add the integration results to determine the SOC 256. As another example, the SOC module 260 may scale or offset the voltage 231 based on the current 224, the scalar of offset determined based on the current 224, and determine the SOC 256 using one of a lookup table and an equation that relates these salved or offset voltages to SOCs of the battery 199. The SOC module 260 may determine the SOC 256 further based on a temperature 264 of the battery 199. The temperature 264 may be, for example, measured using a temperature sensor 268. SOCs are generally provided as a percentage between 0% indicative of 0 charge (i.e., completely discharged) and 100% indicative of the battery 199 being completely charged.

The clutch control module 248 could disengage the clutch 200 when the SOC 256 is greater than a first maximum SOC 272. A first maximum module 276 may set the first maximum SOC 272 to a predetermined fixed SOC that is less than 100%. The first maximum SOC 272 may be set to less than 100% (and greater than 0%), for example, to provide a buffer (or "safe zone") to prevent overcharging of the battery 199. As an example only, the first maximum SOC 272 may be 80% or another suitable SOC.

The clutch 200, however, takes time to transition from engaged to disengaged. Therefore, if the clutch control module 248 initiates disengagement of the clutch 200 when the SOC 256 is greater than the first maximum SOC 272, the SOC 256 may actually exceed the first maximum SOC 272 and enter the buffer SOC region before the clutch 200 is actually disengaged.

A second maximum module 280 therefore sets a second maximum SOC 284 based on the first maximum SOC 272 and an SOC adjustment 288, and the clutch control module 248 disengages the clutch 200 when the SOC 256 is greater than the second maximum SOC 284. The clutch control module 248 maintains the clutch 200 engaged until the vehicle speed 252 is greater than the first predetermined speed and/or the SOC 256 is greater than the second maximum SOC 284. In other words, the clutch control module 248 maintains the clutch 200 engaged when the vehicle speed 252 is less than the first predetermined speed and the SOC 256 is less than the second maximum SOC 284. By disengaging the clutch 200 when the SOC 256 is greater than the second maximum SOC 284, a failsafe switch (to the switch 212) in the low side 308 may therefore be omitted. Omission of the failsafe switch may reduce vehicle cost via the cost of the failsafe switch, engineering and design costs, and/or cost associated with diagnostics of the failsafe switch.

An adjustment module 292 determines the SOC adjustment 288 based on the vehicle speed 252 and the temperature 264 of the battery 199. The adjustment module 292 may determine the SOC adjustment 288, for example, using a lookup table or an equation that relates vehicle speeds and battery temperatures to SOC adjustment values. In the examples of lookup tables herein, interpolation (e.g., linear) may be used for values between lookup table entries. In one example, a three-dimensional lookup table of adjustment values indexed by vehicle speed and battery temperature may be used. In another example, for first battery temperatures (e.g., temperatures greater than a predetermined temperature, such as 0 degrees Celsius) and second battery temperatures (e.g., temperatures less than predetermined temperature), the adjustment module 292 may determine the SOC adjustment 288 using first and second lookup tables, respectively, each of the first and second lookup tables including SOC adjustments indexed by vehicle speeds.

As an example, the second maximum module 280 may set the second maximum SOC 284 based on or equal to the first maximum SOC 272 plus the SOC adjustment 288. As another example, the second maximum module 280 may set the second maximum SOC 284 based on or equal to the first maximum SOC 272 multiplied by the SOC adjustment 288. The second maximum module 280 may set the second maximum SOC 284 equal to the first maximum SOC 272 when the SOC adjustment 288 is equal to a predetermined non-adjusting value. For example, in the example of multiplication of the first maximum SOC 272 with the SOC adjustment 288, the predetermined non-adjusting value of the SOC adjustment 288 may be 1.0. In the example of subtraction of the SOC adjustment 288 from the first maximum SOC 272, the predetermined non-adjusting value of the SOC adjustment 288 may be 0.0.

In the example of multiplication, the adjustment module 292 may set the SOC adjustment 288 to between 0.0 and 1.0 based on the vehicle speed 252 and the temperature 264. In the example of addition, the adjustment module 292 may set the SOC adjustment 288 to 0.0% or less (e.g., up to negative 100%). Addition of the SOC adjustment 288 (being between 0.0% and positive 100%) with the first maximum SOC 272 is another example.

Figure 4:
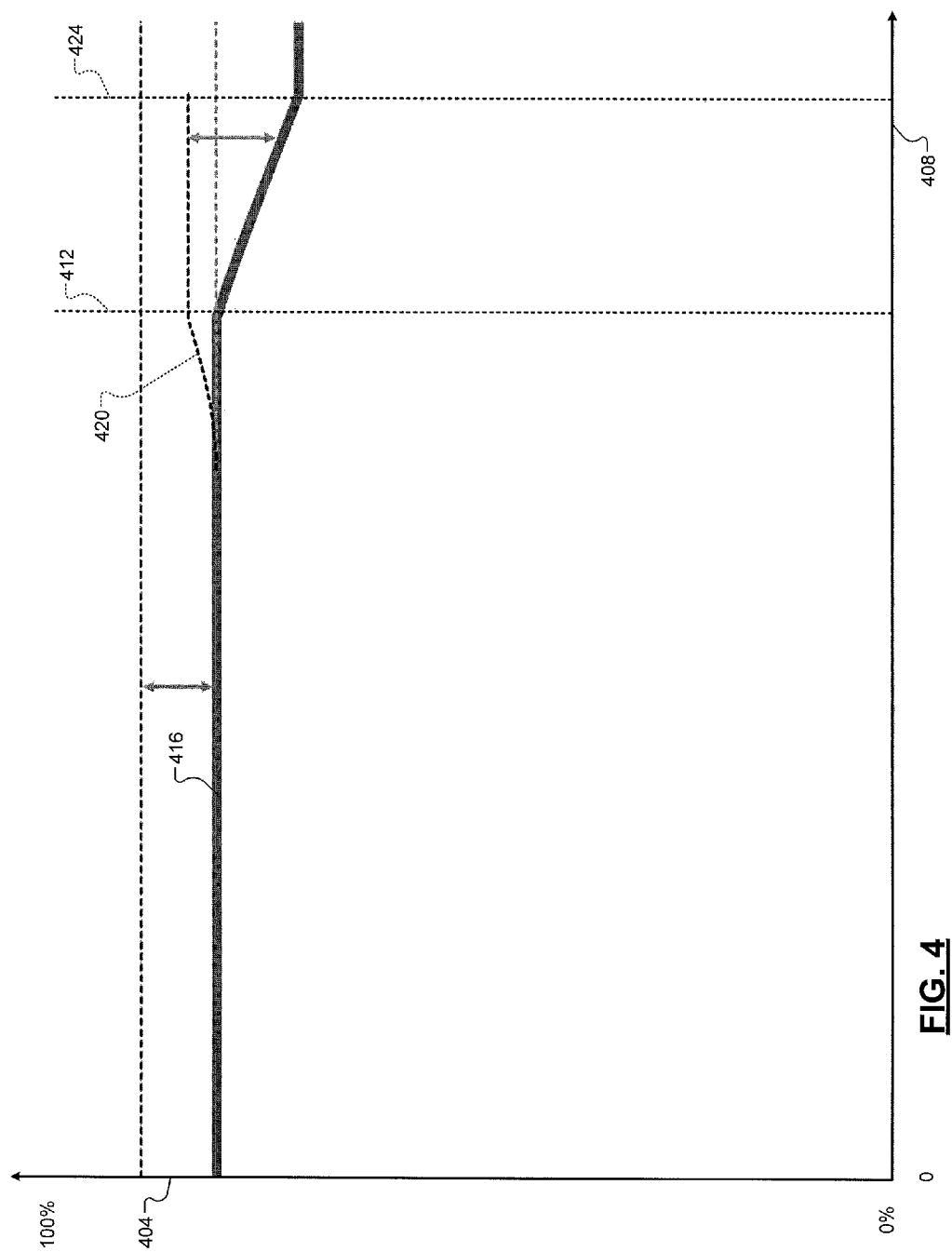
FIGS. 4 and 5 include example graphs of state of charge versus vehicle speed.
Figure 5:
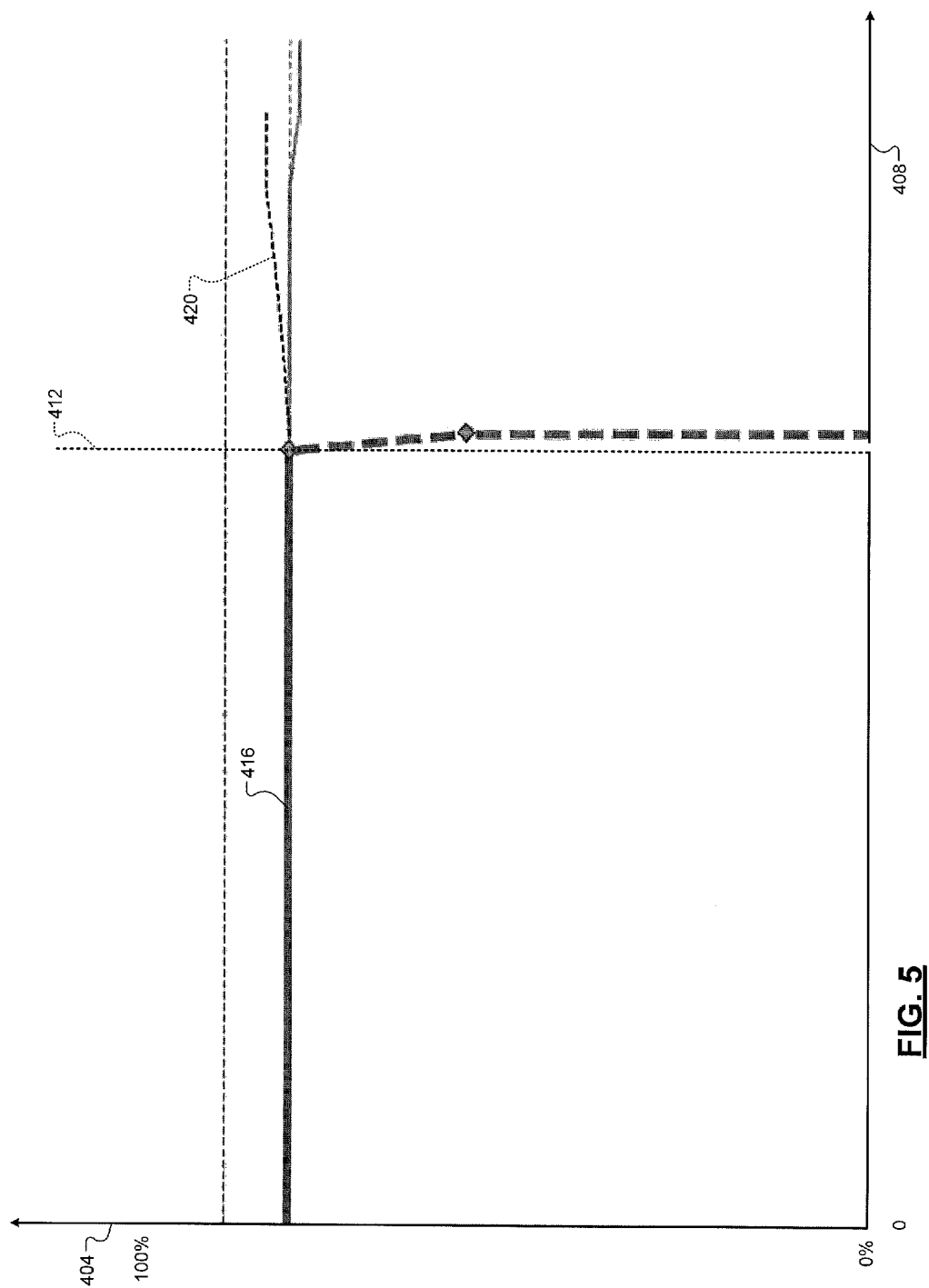

When the vehicle speed 252 is less than a second predetermined speed, the adjustment module 292 may set the SOC adjustment 288 to the predetermined non-adjusting value. The second predetermined speed may be based on the temperature 264. For example, FIGS. 4 and 5 includes example graphs of SOC 404 versus vehicle speed 408 for a first temperature that is greater than the predetermined temperature and a second temperature that is less than the predetermined temperature, respectively. Examples of the second predetermined speed are indicated by 412. The second predetermined speed in FIG. 5 is less than the second predetermined speed in the example of FIG. 4 based on the first temperature of FIG. 4 being greater than the second temperature of FIG. 5.

Trace 416 tracks the second maximum SOC 284. Based on the SOC adjustment 288 being set to the predetermined non-adjusting value, the second maximum SOC 284 may be set equal to the first maximum SOC 272 when the vehicle speed 252 is less than the second predetermined speed 412 (to the left of 412).

The adjustment module 292 decreases the SOC adjustment 288 as the vehicle speed increases above the second predetermined speed 412 (to the right of 412). In the example of FIG. 4, the clutch control module 248 may disengage the clutch 200 when the vehicle speed 252 is greater than the first predetermined speed 424. The adjustment module 292 may therefore stop decreasing the SOC adjustment 288 when the vehicle speed 252 is greater than the first predetermined speed 424.

The adjustment module 292 may decrease the SOC adjustment 288 differently based on the temperature 264. For example, the adjustment module 292 may decrease the SOC adjustment 288 more slowly at higher temperatures (e.g., as in the example of FIG. 4) than at lower temperatures (e.g., as in the example of FIG. 5). In the examples of FIGS. 4 and 5, an example SOC increase during disengagement of the clutch 200 is also illustrated by 420. By decreasing the maximum SOC used to initiate disengagement of the clutch 200, the SOC 256 should not exceed the first maximum SOC 272 during disengagement of the clutch 200. As shown by comparing FIGS. 4 and 5, the maximum SOC may decrease more rapidly as vehicle speed increases and begin decreasing at lower vehicle speeds at low temperatures than under higher temperatures.

Figure 6:
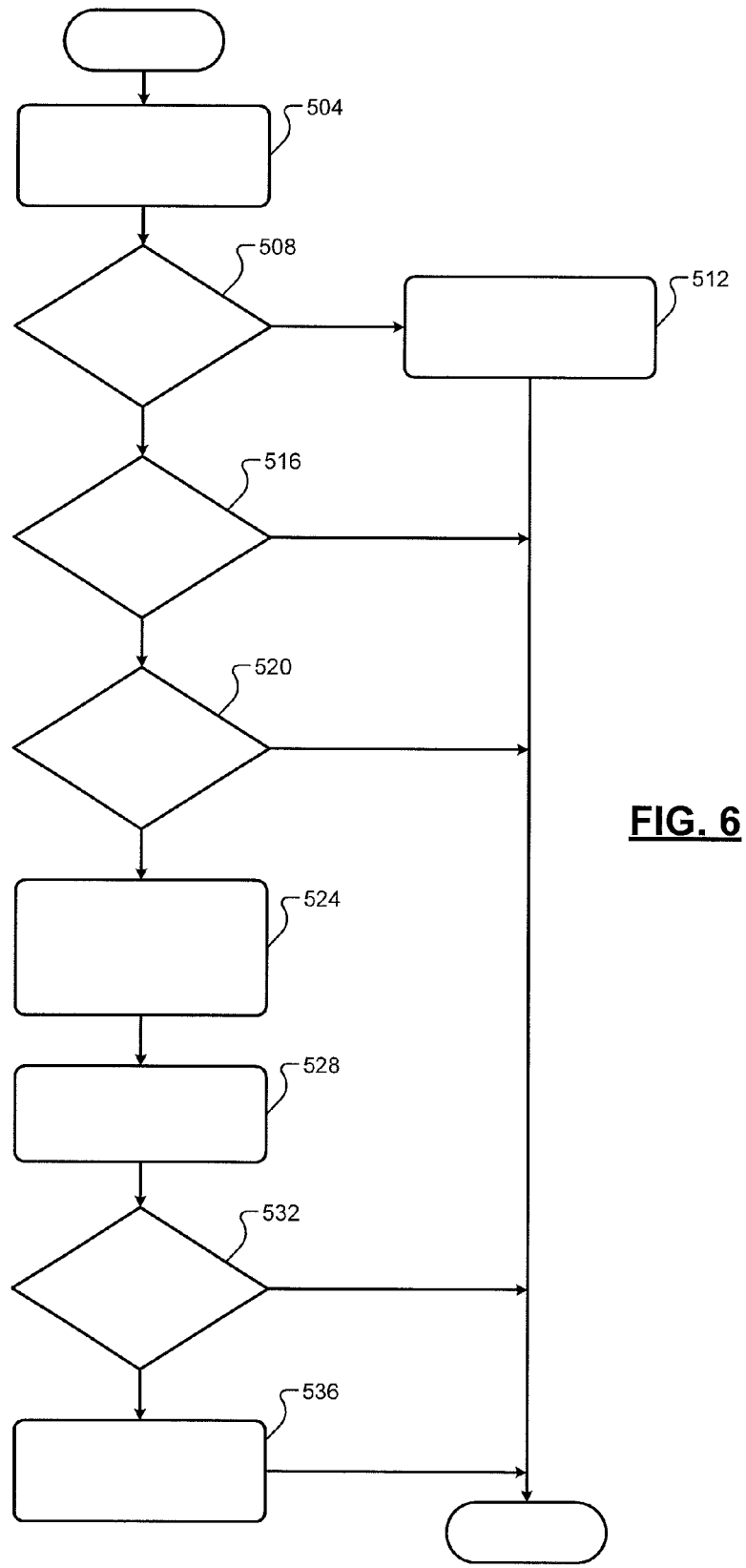
FIG. 6 is a flowchart depicting an example method of controlling engagement/disengagement of a clutch that couples/decouples an electric motor to/from a transmission.

FIG. 6 is a flowchart depicting an example method of controlling engagement/disengagement of the clutch 200. Control may begin when the clutch 200 is engaged. At 504, the SOC module 260 may determine the SOC 256 of the battery 199. At 508, the clutch control module 248 determines whether the vehicle speed 508 is less than the first predetermined speed. If 508 is false, the clutch control module 248 disengages the clutch 200 at 512, and control may end. If 508 is true, control continues with 516.

At 516, the clutch control module 248 may determine whether the electric motor 198 is freewheeling. For example, the clutch control module 248 may determine whether the clutch 200 is engaged and the switching control module 216 is not switching the switches of the inverter power module 208 to apply power to the electric motor 198. The electric motor 198 generates and outputs power when the clutch 200 is engaged (and the transmission 195 is driving rotation of the electric motor 198) and the inverter power module 208 is not switching to apply power to the electric motor 198. If 516 is true, control continues with 520. If 516 is false, control may end.

At 520, the clutch control module 248 determines whether the switch 212 is stuck or welded closed. For example, the clutch control module 248 may determine whether the fault indicator 232 in the memory 236 is in the first state. If 520 is true, control continues with 524. If 520 is false, the clutch control module 248 may maintain the clutch 200 engaged, and control may end.

The adjustment module 292 determines the SOC adjustment 288 at 524. The adjustment module 292 determines the SOC adjustment 288 based on the vehicle speed 252 and the temperature 264, for example, using one or more functions or lookup tables that relate vehicle speeds and battery temperatures to SOC adjustments.

At 528, the second maximum module 280 determines the second maximum SOC 284 of the battery 199 based on the first maximum SOC 272 and the SOC adjustment 288. The second maximum module 280 may set the second maximum SOC 284 equal to the first maximum SOC 272 when the SOC adjustment 288 is equal to the predetermined non-adjusting value. When the SOC adjustment 288 is not equal to the predetermined non-adjusting value, the second maximum module 280 decreases the first maximum SOC 272 based on the SOC adjustment 288 to determine the second maximum SOC 284.

At 532, the clutch control module 248 may determine whether the SOC 256 of the battery 199 is less than the second maximum SOC 284. If 532 is true, the clutch control module 248 may maintain the clutch 200 engaged, and control may end. If 532 is false, the clutch control module 248 initiates disengagement of the clutch 200 at 536, and control ends. While the example of control ending is provided, the example of FIG. 5 is illustrative of one control loop and control may return to 504.

Figure 7:
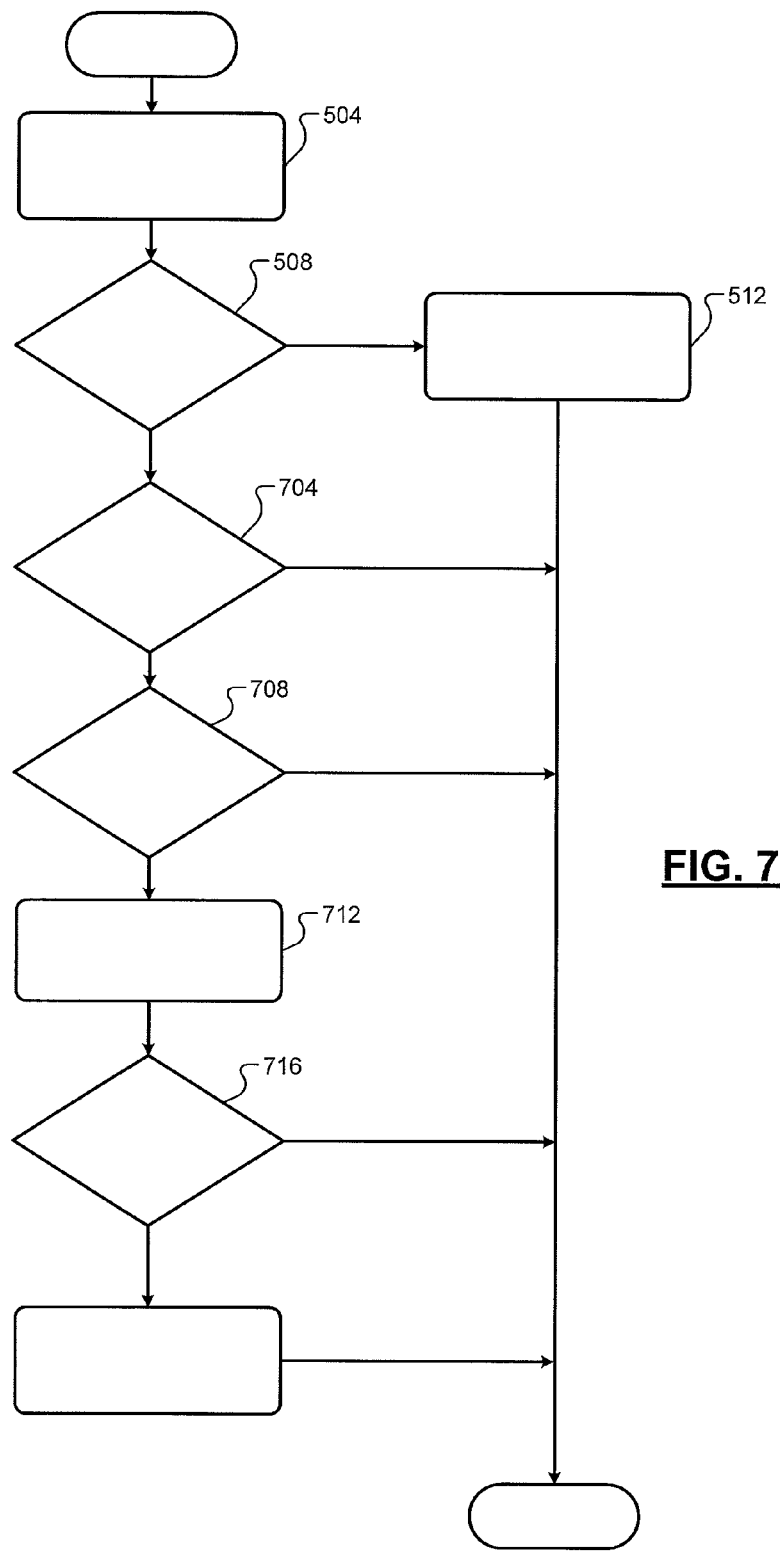
FIG. 7 is a flowchart depicting an example method of controlling engagement/disengagement of the clutch and opening of a switch connected between a battery and an electric motor.

FIG. 7 is a flowchart depicting an example method of controlling engagement/disengagement of the clutch 200 and opening of the switch 212. Control may begin when the clutch 200 is engaged and the switch 212 is closed. At 504, the SOC module 260 may determine the SOC 256 of the battery 199. At 508, the clutch control module 248 determines whether the vehicle speed 508 is less than the first predetermined speed. If 508 is false, the clutch control module 248 disengages the clutch 200 at 512, and control may end. If 508 is true, control continues with 704.

At 704, the clutch control module 248 may determine whether the electric motor 198 is freewheeling. For example, the clutch control module 248 may determine whether the clutch 200 is engaged and the switching control module 216 is not switching the switches of the inverter power module 208 to apply power to the electric motor 198. The electric motor 198 generates and outputs power when the clutch 200 is engaged (and the transmission 195 is driving rotation of the electric motor 198) and the inverter power module 208 is not switching to apply power to the electric motor 198. If 704 is true, control continues with 708. If 704 is false, control may end.

At 708, the switching control module 216 determines whether to open the switch 212. For example, the switching control module 216 may determine to open the switch when the vehicle speed 508 is less than a third predetermined speed that is less than the first predetermined speed and greater than zero. The voltage of the battery 199 may be greater than the voltage output by the electric motor 198 when the vehicle speed 508 is less than the third predetermined speed. As such, current flow to the battery 199 is zero when the vehicle speed 508 is less than the third predetermined speed. If 708 is true (e.g., the vehicle speed 508 is less than the third predetermined speed and/or current to the battery 199 is zero), control continues with 712. If 708 is false, the clutch control module 248 may maintain the clutch 200 engaged and the switching control module 216 may maintain the switch 212 closed, and control may end. In various implementations, the switching control module 216 may determine the third predetermined speed based on the voltage of the battery 199.

At 712, the switching control module 216 opens the switch 212. The clutch 200 can be disengaged once the switch 212 is open. For example, the clutch control module 248 may determine whether the switch 212 is open at 716. The clutch control module 248 may determine that the switch 212 is open, for example, in response to the switching control module 216 generating a signal to open the switch 212 or when current flow to and from the battery 199 is zero. If 712 is true, the clutch control module 248 may disengage the clutch 200 at 720, and control may end. If 712 is false, the clutch control module 248 may maintain the clutch 200 engaged and control may end. While the example of control ending is provided, the example of FIG. 5 is illustrative of one control loop and control may return to 504.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A state of charge (SOC) control system of a vehicle comprising:
   an inverter power module that:
      when being switched, selectively applies power from a battery to a permanent magnet (PM) electric motor; and
      when not being switched, selectively provides power output by the PM electric motor for the battery;
   a switch (i) that is connected between the inverter power module and the battery, (ii) that, when open, prevents power flow the inverter power module from the battery, and (iii) that, when closed, enables power flow between the inverter power module and the battery;
   an adjustment module that determines an SOC adjustment based on at least one of (i) a vehicle speed and (ii) a temperature of the battery;
   a maximum module that receives a first maximum SOC of the battery that is less than 100 percent and that determines a second maximum SOC of the battery based on the first maximum SOC and the SOC adjustment; and
   a clutch control module that disengages a clutch, thereby decoupling the PM electric motor from a transmission, when the switch is stuck closed and an SOC of the battery is greater than the second maximum SOC.

2. The SOC control system of claim 1 further comprising a SOC module that determines the SOC of the battery based on at least one of a voltage of the battery and current through the switch.

3. The SOC control system of claim 1 wherein:
   the adjustment module sets the SOC adjustment to a predetermined value when the vehicle speed is less than a predetermined speed; and
   the maximum module sets the second maximum SOC equal to the first maximum SOC when the SOC adjustment is set to the predetermined value.

4. The SOC control system of claim 3 wherein, when the vehicle speed is greater than the predetermined speed, the maximum module sets the second maximum SOC to less than the first maximum SOC based on the SOC adjustment.

5. The SOC control system of claim 1 wherein the adjustment module determines the SOC adjustment based on both (i) the vehicle speed and (ii) the temperature of the battery.

6. The SOC control system of claim 5 wherein the adjustment module determines the SOC adjustment using a lookup table that relates vehicle speeds and battery temperatures to SOC adjustments.

7. The SOC control system of claim 5 wherein:
   the adjustment module sets the SOC adjustment to a first value when the vehicle speed is a first speed and the temperature of the battery is a first temperature;
   the adjustment module sets the SOC adjustment to a second value when the vehicle speed is the first speed and the temperature of the battery is a second temperature;
   the second temperature is less than the first temperature;
   the maximum module sets the second maximum SOC to a third value based on the first maximum SOC when the SOC adjustment is set to the first value;
   the maximum module sets the second maximum SOC to a fourth value based on the first maximum SOC when the SOC adjustment is set to the second value; and
   the fourth value is less than the third value.

8. The SOC control system of claim 1 wherein the clutch control module also disengages the clutch when the vehicle speed is greater than a predetermined speed.

9. The SOC control system of claim 8 wherein the predetermined speed is greater than 80 miles per hour.

10. The SOC control system of claim 1 wherein zero other switches are connected between inverter power module and the battery to, independently of whether the switch is open or closed, enable power flow between the inverter power module and the battery.

11. A state of charge (SOC) control method for a vehicle comprising:
by an inverter power module, when being switched, selectively applying power from a battery to a permanent magnet (PM) electric motor;
by the inverter power module, when not being switched, selectively providing power output by the PM electric motor for the battery;
selectively opening and closing a switch is connected between the inverter power module and the battery,
wherein, when open, the switch prevents power flow the inverter power module from the battery, and
wherein, when closed, the switch enables power flow between the inverter power module and the battery;
determining an SOC adjustment based on at least one of (i) a vehicle speed and (ii) a temperature of the battery;
receiving a first maximum SOC of the battery that is less than 100 percent;
determining a second maximum SOC of the battery based on the first maximum SOC and the SOC adjustment; and
disengaging a clutch, thereby decoupling the PM electric motor from a transmission, when the switch is stuck closed and an SOC of the battery is greater than the second maximum SOC.

12. The SOC control method of claim 11 further comprising determining the SOC of the battery based on at least one of a voltage of the battery and current through the switch.

13. The SOC control method of claim 11 further comprising:
setting the SOC adjustment to a predetermined value when the vehicle speed is less than a predetermined speed; and
setting the second maximum SOC equal to the first maximum SOC when the SOC adjustment is set to the predetermined value.

14. The SOC control method of claim 13 further comprising, when the vehicle speed is greater than the predetermined speed, setting the second maximum SOC to less than the first maximum SOC based on the SOC adjustment.

15. The SOC control method of claim 11 further comprising determining the SOC adjustment based on both (i) the vehicle speed and (ii) the temperature of the battery.

16. The SOC control method of claim 15 further comprising determining the SOC adjustment using a lookup table that relates vehicle speeds and battery temperatures to SOC adjustments.

17. The SOC control method of claim 15 further comprising:
setting the SOC adjustment to a first value when the vehicle speed is a first speed and the temperature of the battery is a first temperature;
setting the SOC adjustment to a second value when the vehicle speed is the first speed and the temperature of the battery is a second temperature,
wherein the second temperature is less than the first temperature;
setting the second maximum SOC to a third value based on the first maximum SOC when the SOC adjustment is set to the first value; and
setting the second maximum SOC to a fourth value based on the first maximum SOC when the SOC adjustment is set to the second value,
wherein the fourth value is less than the third value.

18. The SOC control method of claim 11 further comprising disengaging the clutch when the vehicle speed is greater than a predetermined speed.

19. The SOC control method of claim 18 wherein the predetermined speed is greater than 80 miles per hour.

20. The SOC control method of claim 11 wherein zero other switches are connected between inverter power module and the battery to, independently of whether the switch is open or closed, enable power flow between the inverter power module and the battery.

* * * * *